(12) United States Patent
Brantley et al.

(10) Patent No.: US 9,015,069 B2
(45) Date of Patent: Apr. 21, 2015

(54) SYSTEM AND METHOD FOR ORDER PROCESSING USING CUSTOMER LOCATION INFORMATION

(71) Applicant: Wal-Mart Stores, Inc., Bentonville, AR (US)

(72) Inventors: Travis Brantley, Pea Ridge, AR (US); Bryan Finster, Centerton, AR (US); Ben Rowse, Bentonville, AR (US); Khem Chander, Bentonville, AR (US); Anthony G. Wind, Gravette, AR (US)

(73) Assignee: Wal-Mart Stores, Inc., Bentonville, AR (US)

( * ) Notice: Subject to any disclaimer, the term of this patent is extended or adjusted under 35 U.S.C. 154(b) by 0 days.

(21) Appl. No.: 13/804,905

(22) Filed: Mar. 14, 2013

(65) Prior Publication Data

US 2014/0279269 A1 Sep. 18, 2014

(51) Int. Cl.
*G06Q 30/00* (2012.01)
*G06Q 30/06* (2012.01)

(52) U.S. Cl.
CPC .................................. *G06Q 30/0635* (2013.01)

(58) Field of Classification Search
None
See application file for complete search history.

(56) References Cited

U.S. PATENT DOCUMENTS

| | | | |
|---|---|---|---|
| 2002/0143638 A1* | 10/2002 | August et al. | 705/26 |
| 2003/0216950 A1* | 11/2003 | Chen | 705/8 |
| 2004/0236635 A1* | 11/2004 | Publicover | 705/26 |
| 2007/0088624 A1* | 4/2007 | Vaughn et al. | 705/26 |
| 2007/0150375 A1* | 6/2007 | Yang | 705/26 |
| 2007/0226071 A1* | 9/2007 | Kern et al. | 705/26 |
| 2008/0313052 A1* | 12/2008 | Otto et al. | 705/26 |
| 2012/0072311 A1* | 3/2012 | Khan | 705/26.81 |
| 2012/0078673 A1* | 3/2012 | Koke et al. | 705/7.13 |
| 2012/0191573 A1* | 7/2012 | Miller | 705/26.81 |
| 2013/0151380 A1* | 6/2013 | Holt | 705/26.81 |

OTHER PUBLICATIONS

"supplier showcase", 2009, Refrigerated Transporter, vol. 44, No. 8, pp. 46.*
International Search Authority Report and Written Opinion for International Application No. PCT/US14/22580 dated May 13, 2014.

* cited by examiner

*Primary Examiner* — Courtney Stopp
*Assistant Examiner* — Brittany Bargeon
(74) *Attorney, Agent, or Firm* — McCarter & English, LLP; David R. Burns

(57) ABSTRACT

Exemplary embodiments are directed to electronic order processing of items in an electronic commerce environment. A geographic boundary associated with a physical location of a retail entity can be implemented using, for example, a geofence. An order for an item from the retail location can be received by a customer and a notification prioritizing processing of the order can be generated based on a location of the user relative to the geographic boundary.

15 Claims, 7 Drawing Sheets

SYSTEM AND METHOD FOR ORDER PROCESSING USING CUSTOMER LOCATION INFORMATION

BACKGROUND

Some retail entities allow a customer to order items electronically, e.g., via a website of the retail entities, and allow the customer to specify a physical retail location at which the customer wishes to pick-up the ordered item. The customer can then travel to the requested store location to pick-up the item. However, once the customer arrives at the store, the customer generally must wait in line and then present a receipt which can be used by an employee of the retail entity to request the item from the stock room/storage area, at which time another employee looks for the item. Once the item is located, the item can be brought to the customer.

In recent years, there has been an increase in the use of mobile technology to improve and/or advance the order fulfillment process. For example, grocery stores allow customers to order deli items through a kiosk in the store and allow the customers to provide a phone number with the order. The order is then placed in the queue and the customer can continue to shop while his deli order is prepared. When the order is ready, the deli can send a text message to the customer's cell phone notifying the customer that the order can be picked up. As a result, the customer no longer has to wait in line or "pick a number." However, using this approach, the orders is still processed according to its place in the queue. Some pharmacies process prescription order in a similar manner (e.g., by automatically notifying the customer when the prescription is filled and ready for pick-up).

Despite the increased use of technology in order fulfillment, there remains inefficiencies. For example, customers may submit an order for items that they intend to pick-up at some future time. When these orders are processed according to a queue, a customer who submitted an order after another customer, but who intends to pick-up the order before the other customer, still has to wait for the other customers order to be filled. Some retail entities may inquire about the time the customer intends to pick-up the order and may prioritize the order to fulfill the order by the requested time. However, if the customer arrives substantially after the requested time, the retails entity's prioritization of the order may have been unnecessary and/or may have effected processing of orders submitted by other customers.

SUMMARY

Exemplary embodiments of the present disclosure are directed to a system, non-transitory computer program product, and method for processing orders received by a seller (e.g., a retailer) to prioritize filling and/or staging of the customer orders based on a location of one or more customers. Exemplary embodiments can be implemented to define a geographic boundary having a geographic area and to determine a customer's location relative to the geographic boundary using a customer's mobile device. When a customer is detected within the geographic boundary, a notification can be generated by exemplary embodiments to instruct an employee of the commercial entity to perform one or more order processing tasks.

In one embodiment, a method of processing an order for an item, via an electronic environment is disclosed. The method includes implementing a geographic boundary associated with a physical location of a retail entity and receiving, from a customer, an order for an item from the retail entity. The method further includes generating a notification prioritizing processing of the order based on a location of the user relative to the geographic boundary.

In another embodiment, a non-transitory computer-readable storage product or device configured to store instructions executable by a processing device is disclosed. Execution of the instructions causes the processing device to implement a method that includes implementing a geographic boundary associated with a physical location of a retail entity, receiving, from a customer, an order for an item from the retail location, and generating a notification prioritizing processing of the order based on a location of the user relative to the geographic boundary.

In yet another embodiment, a system for processing an order for an item is disclosed. The system includes a non-transitory computer readable medium and a processing device. The non-transitory computer readable medium stores an order processing engine and the processing device is programmed to execute the order processing engine to implement a geographic boundary associated with a physical location of a retail entity, receive, from a customer, an order for an item from the retail location, and generate a notification prioritizing processing of the order based on a location of the user relative to the geographic boundary.

In some embodiments, it can be determined whether the customer is within the geographic boundary based on a detection of a mobile device associated with the customer and a notification to fill the order for the item can be generated based on a determination of whether the customer is within the geographical boundary. The notification to fill the order can include a notification to prioritize fulfillment of the order in response to a determination that the customer (e.g., the customer's mobile device) is within the geographic boundary.

In some embodiment's, a message from the customer can be received that indicates that the customer intends to pick-up the order, a notification to fill the order in response to the message can be generated, a determination of whether the customer is within the geographic boundary based on a detection of a mobile device associated with the customer and a notification to fill the order for the item based on a determination of whether the customer is within the geographical boundary can be generated.

In some embodiments, the order can be an electronic order received via a data communications network.

In some embodiments, a subscription to a location monitoring service can be received from the customer. The subscription to the service can permit determining whether the customer is within the geographic boundary.

In some embodiments, an indicator associated with the item can be controlled to identify the item corresponding to the order in response to a determination that the customer is within the geographic boundary. The indicator can be a light source affixed to the item and controlling the indicator comprising illuminating the light source.

In some embodiments, an identifier associated with the order can be sent to the customer. The identifier can be scanned when the customer arrives at the physical location of the retail entity to identify the item associated with the order and an indicator associated with the order can be activated in response to the scanning the identifier.

Any combination of embodiments is envisioned. Other objects and features will become apparent from the following detailed description considered in conjunction with the accompanying drawings. It is to be understood, however, that the drawings are designed as an illustration only and not as a definition of the limits of the invention.

DESCRIPTION OF EXEMPLARY EMBODIMENTS

Exemplary embodiments of the present disclosure are directed to processing and/or prioritizing orders using location information associated with a customer. In exemplary embodiments, a customer can order an item from a seller. Fulfillment and/or staging of the order can be facilitated based on whether the customer is within a defined geographical boundary and/or whether the customer has indicated that he/she would like to pick-up the item. For example, fulfillment and/or staging of ordered items can be prioritized based on the location or proximity of the customers that ordered the items to the requested pick-up location. For example, when a customer is within a defined geographic boundary, exemplary embodiments can receive location data associated with the customer and can generate an electronic notification to an employee of the retail location to process the customer's order independent of the position of the order in the queue. Exemplary embodiments of the present disclosure can facilitate efficient and effective processing of orders.

Figure 1:
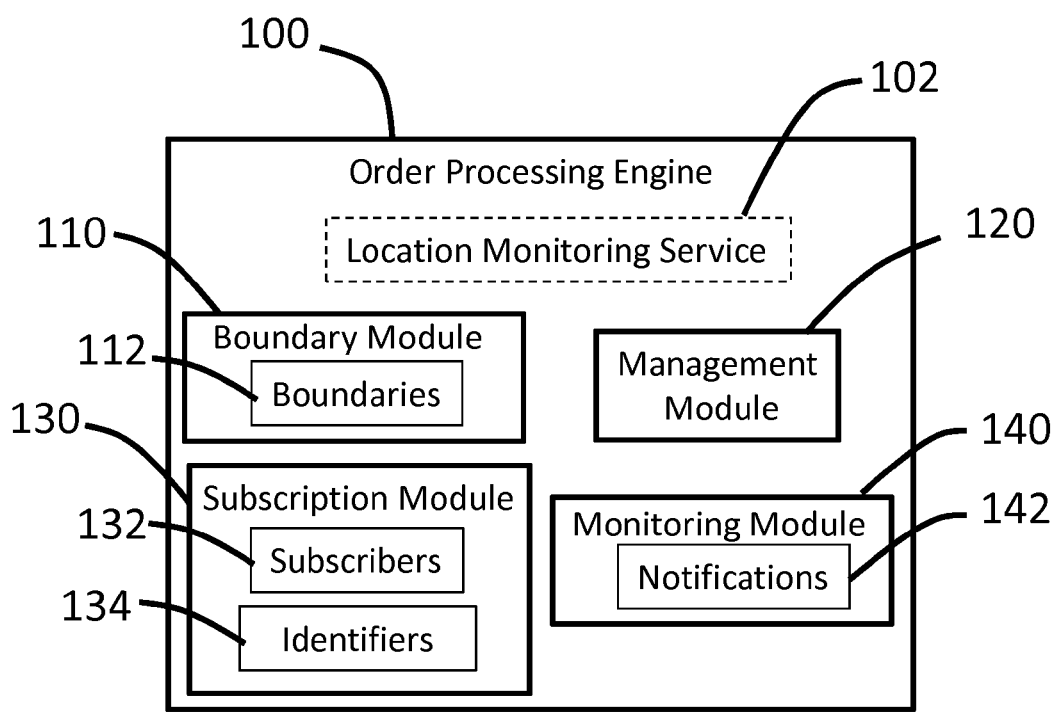
FIG. 1 is a block diagram of an exemplary order processing engine.

FIG. 1 is a block diagram of an exemplary order processing engine 100 that can be implemented in an electronic commerce system and/or environment. The order processing engine 100 can include a boundary module 110, an order management module 120, a subscription module 130, and a monitoring module 140. In exemplary embodiments, the engine 100 can be programmed and/or configured to receive customer location data and to output a queue position of the customer's order or other order information based on the location data, including, for example, an electronic notification to prioritize the customer's order based on the location data. For example, the engine 100 can be programmed and/or configured to implement a customer location monitoring service 102 using the location data and an operation and/or interaction between the modules 110, 120, 130, and/or 140. The customer location monitoring service 102 can be used to electronically monitor whether a customer enters or exits a geographical area and can programmatically generate electronic notifications (e.g., alerts) to employees of a retail entity to, for example, perform one or more order processing tasks, as discussed in more detail below.

The boundary module 110 can be programmed and/or configured to implement one or more geographical boundaries 112. The geographic boundaries 112 can define a geographic perimeter encompassing a geographical area. The geographical boundaries 112 can be used by the engine 100 to programmatically provide a geographical area within which a customer can be automatically detected by the monitoring module 120 based on customer location data received by the engine 100, as described in more detail below. In some embodiments, the boundaries 112 can coincide with and/or be coextensive with physical boundaries, such as, for example, the exterior walls of a building.

In some embodiments, the module 110 can be programmed and/or configured to determine the boundaries 112 based on a range of one or more wireless access points (e.g., wireless routers) that can be geographically distributed and can be programmatically monitored by the module 110. The combined coverage of the wireless access points can define the geographic area or areas forming the boundary or boundaries. When a customer's mobile device is within the range of one or more of the wireless access points, the wireless access points can detect the customer's mobile device (e.g., based on one or more messages sent by the customer's mobile device) and can send an electronic message to the engine 100 including location data associated with the customer.

In some embodiments, the boundaries 112 can be established using a geo-fence. A geo-fence is a geographic boundary that can be defined according to a geographic map. A perimeter of the geo-fence can be defined based on a GPS-based geographical area. In some embodiments, the module 110 can be programmed and/or configured to allow an operator to define a geographical area to be included within a geo-fence. As one example, the module 110 can be programmed and/or configured to allow the operator to define a geographical area by allowing the operator to specify longitudinal and latitudinal coordinates to define the geo-fence and/or by allowing the operator to overlay the GPS-based geo-fence on an electronically generated geographical map. When a customer's GPS enabled mobile device enters or exits a geo-fence (e.g., crosses the perimeter of one of the boundaries), a notification that the customer has entered or exited a geo-fence can be generated by the customer's mobile device and can be sent to the engine 100 to indicate that the customer has entered or exited the geographical area.

The order management module 120 can be programmed and/or configured to maintain a record of pending orders and associated customer identifiers. As one example, in some embodiments, when a customer places an order for an item, the order along with some identifying characteristic (e.g., customer's name, address, and/or cell phone number) can be programmatically received by the module 120. As another example, in some embodiments, an employee at the retail entity can provide order information to be maintained by the module 120 via an operator terminal, such as a point-of-sale (POS) terminal or any other suitable device.

The subscription module 130 can be programmed and/or configured to maintain a record of customers that subscribed (i.e., subscribers 132) to the customer location monitoring service 102 provided by the engine 100. The module 130 can be programmed and/or configured to associate the subscribers 132 with customer identifiers 134, which can be used by the modules 120, 130, and 140 to associate a customer with an order. In one exemplary embodiment, when a customer orders an item, the customer can chose to subscribe to the customer location monitoring service 102. In some embodiments, if the customer has previously subscribed to the service 102, the engine 100 can be programmed and/or configured to implement the service 102 for the customer without requiring the customer to subscribe to the service 102 again. In some embodiment, the engine 100 can be programmed and/or configured to require the customer to re-subscribe to the service 102 each time the customer submits an order.

The monitoring module 140 can be programmed and/or configured to determine whether customers that have subscribe to the service 102, and have pending orders, are within the boundaries 112 by interacting with the modules 120 and/or 130, respectively. For example, the module 140 can be programmed and/or configured to be in communication with a mobile device associated with the customer based on the customer identifiers maintained by the engine 100. For example, a customer can carry a mobile device, such as a cell phone, tablet, and/or any other suitable device that is configured for wireless communication and can be programmed and/or configured for directly and/or indirectly communicating with the engine 100. In some embodiments, the mobile device can include GPS functionality such that the location of the mobile device can be determined using GPS tracking. When the mobile device enters the boundaries 112, as determined by the GPS tracking, the mobile device can send an electronic message to the module 140 notifying the module 140 of the customer's presence.

Upon programmatically detecting that the customer is within the boundary 112, the module 140 can be programmed and/or configured to generate one or more electronic order processing notifications 142 to the employees at the physical location of the retail entity. The electronic notifications can instruct the employees to perform one or more order processing tasks. For example, the module 140 can display an alert on an operator terminal at the physical location of the retail entity and/or can send an alert to a handheld device carried by an employee of the physical retail location. In some embodiments, the module 140 can be programmed and/or configured to send a response to the customer's mobile device indicating that the engine 100 received the message and that the order will be ready for pick-up when the customer arrives.

In an exemplary operation, the service 102 implemented by the engine 100 can facilitate order fulfillment and/or order staging in response to a presence of a customer's mobile device within the boundary 112 monitored by the engine 100. For example, in one embodiment, a pharmacy can use the service 102 for the pharmacy's prescription filling process. A customer can submit a prescription or can have a prescription submitted on behalf of the customer (e.g., by a doctor) to the pharmacy, and the customer can subscribe to the service 102, which can be maintained by the module 130. In exemplary embodiments, the prescription can be called in by the customer's doctor, submitted electronically, and/or drop off by the customer. The order information can be maintained by the module 120 and an encoded identifier (e.g., a bar code, Quick Response (QR) code, etc.) can be automatically sent to the customer (e.g., to the customer's mobile device). When the customer comes to the pharmacy to pick up the prescription, the customer's presence within the boundary 112 can be programmatically monitored by the module 140 based on the detection of the customer's mobile device.

In response to detecting the presence of the customer's mobile device within the boundary 112, the module 140 can generate an electronic notification to notify the employees of the pharmacy that the customer is coming and that the customer's prescription should be prioritized to fill the prescription for the customer ahead of other orders in the queue. In some embodiments, the customer can also send an electronic message to the pharmacy to notify that the customer intends to pick up the prescription. When the customer arrives at the pharmacy, the customer can display the encoded identifier on the mobile device and can present the encoded identifier to the employee of the pharmacy. The employee can scan the encoded identifier. The scanned encoded identifier is received by the engine 100 and the engine 100 can be programmed and/or configured to control or activate an indicator, such as a light source (e.g., a light emitting diode) associated with (e.g., affixed to) the prescription to illuminate the prescription so that the employee can quickly and easily identify and retrieve the customer's prescription.

While an exemplary embodiment of the service 102 is described with respect to a pharmacy application, those skilled in the art will recognize that the service 102 can be implemented in other applications. For example, the service 102 can be implemented in any suitable order pick-up environment, such as, for example, a merchandise pick-up environment (e.g., various retail entities, store departments, dry cleaners, Laundromats, as well as any other like businesses and/or services).

Figure 2A:
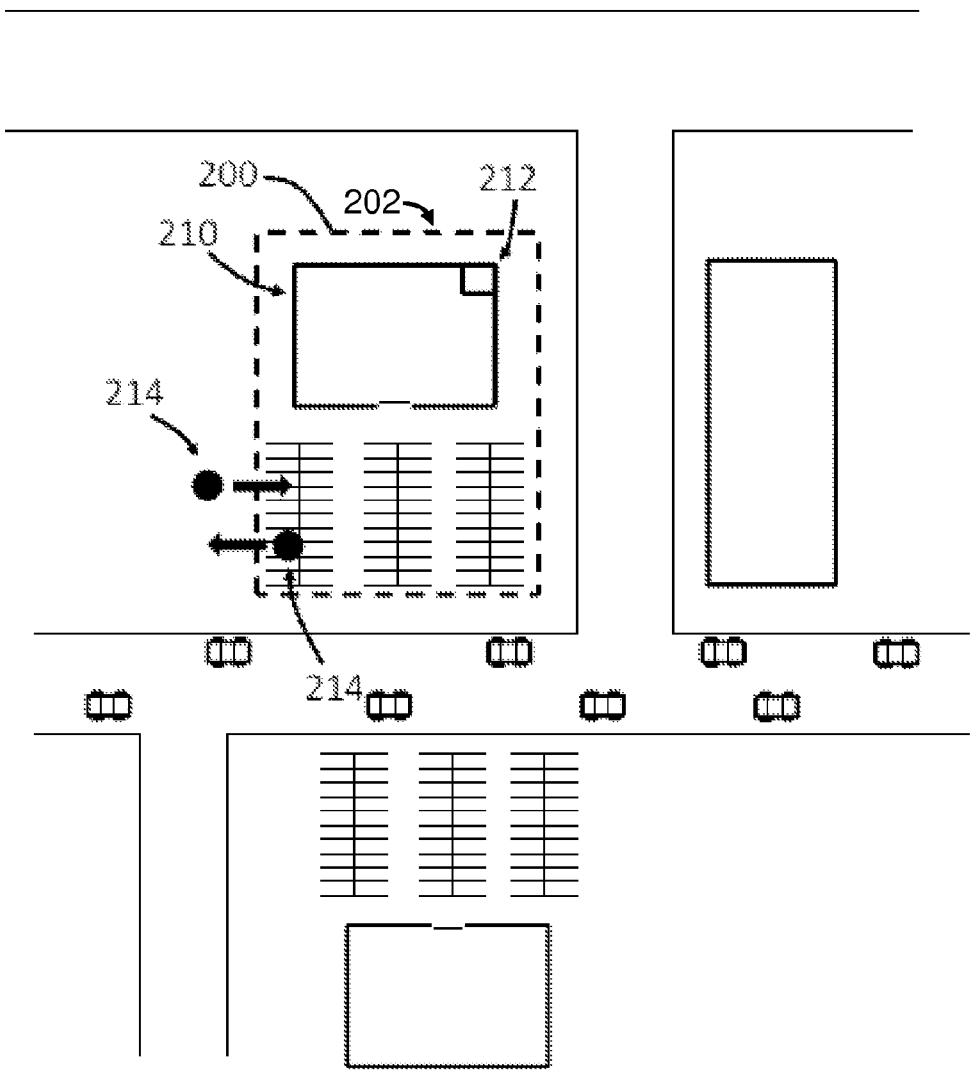
FIG. 2A is a diagram illustrating a geographic boundary that can be implemented in accordance with exemplary embodiments.

FIG. 2A is a diagram illustrating a geographic boundary 200 that can be defined by the engine 100 in accordance with exemplary embodiments of the present disclosure. In the present embodiment, a physical location 210 of a retail entity can include, for example, a pharmacy department 212. The retail entity can implement an exemplary embodiment of the customer location monitoring service 102 using the boundary 200 via an embodiment of the engine 100. The boundary 200 can have a specified geometry and can have a perimeter 202. For example, in the present embodiment, the boundary 200 can be rectangular and encompasses the physical location 210 of the retail entity. In exemplary embodiments, the boundary 200 is implemented and/or used by an embodiment of the engine 100 to determine when a customer 214 enters the boundary 200 and/or exits the boundary 200.

Figure 2B:
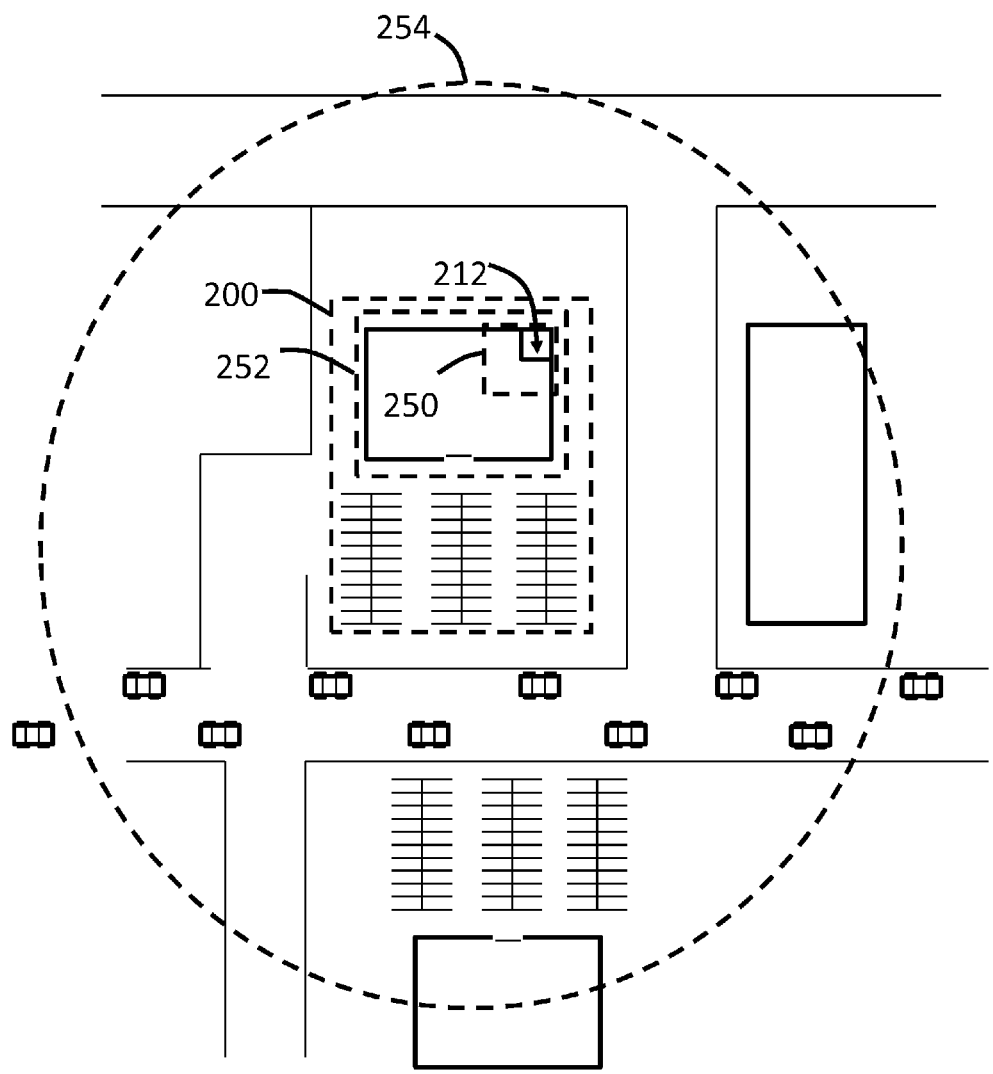
FIG. 2B is a diagram illustrating various geographic boundaries that can be implemented in accordance with exemplary embodiments.

While a single boundary 200 is shown in FIG. 2A, those skilled in the art will recognize that multiple boundaries can be implemented in accordance with exemplary embodiments of the present disclosure. For example, as shown in FIG. 2B, a boundary 250 can encompass the pharmacy department 212, a boundary 252 can encompass the building, the boundary 200 can encompass the lot, and the boundary 254 can encompass a radius surrounding the physical location of the retail entity such that a customer's movement into and out of any of the boundaries can be detected and used by the engine 100.

Figure 3:
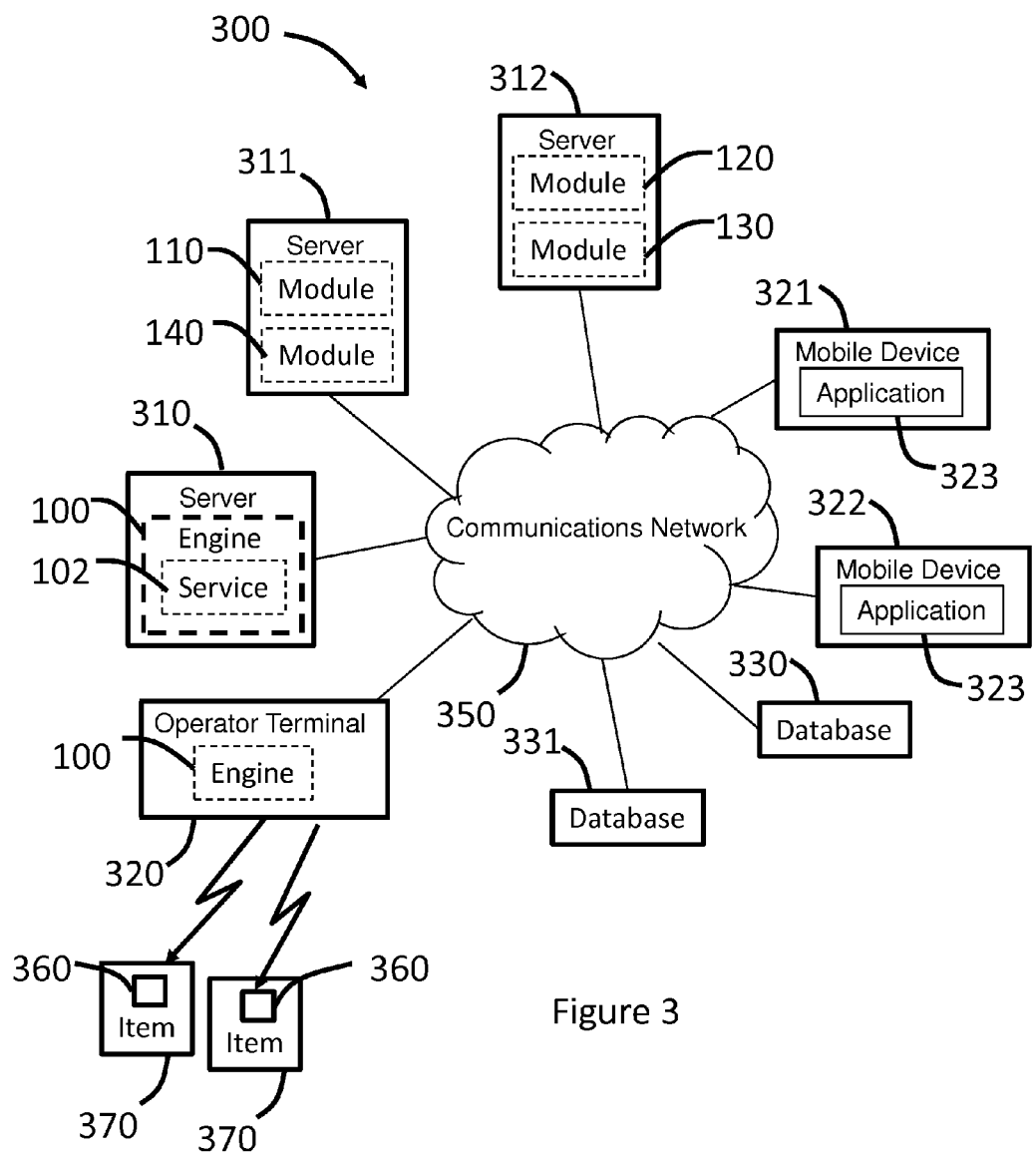
FIG. 3 is a network environment configured to implement a customer location monitoring service of an embodiment of the order processing engine.
Figure 4:
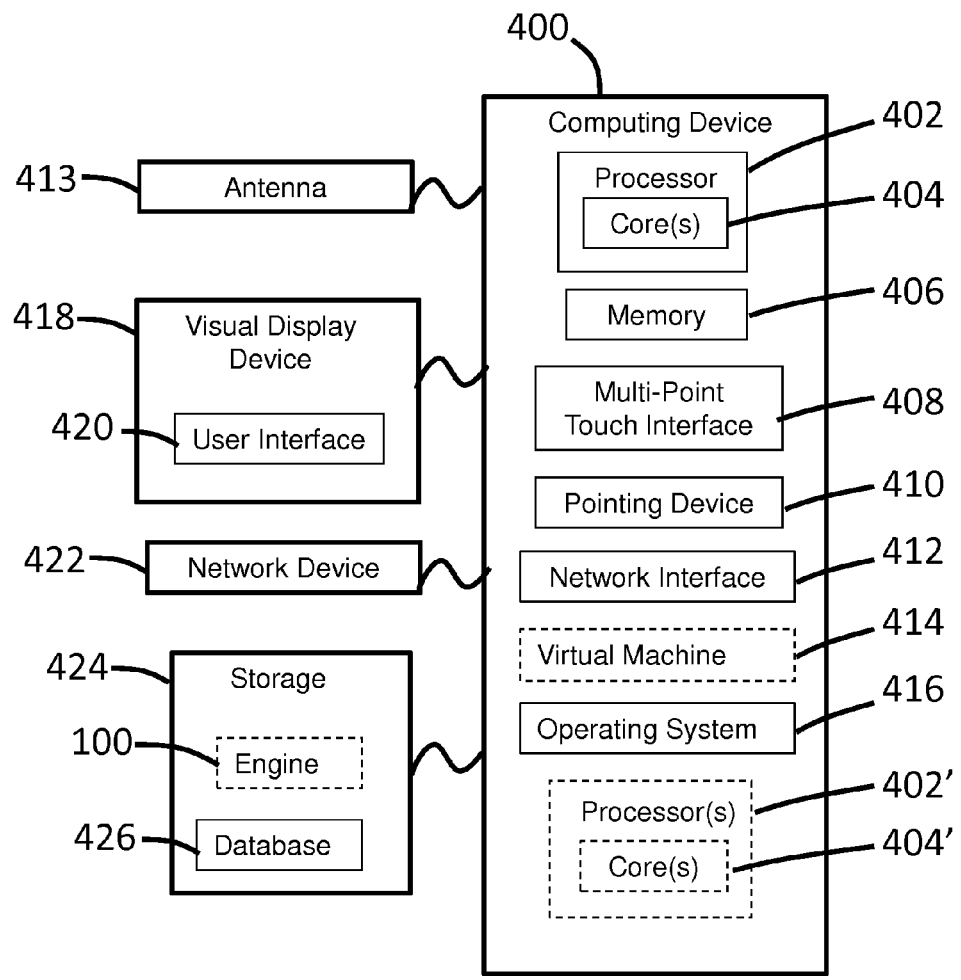
FIG. 4 is a block diagram is a block diagram of an exemplary computing device that may be used to implement exemplary embodiments of the order processing engine.

FIG. 3 is a network representation of an electronic commerce environment 300 configured to implement one or more embodiments of the customer location monitoring service 102 implemented by an embodiment of the engine 100. The environment 300 includes servers 310-312 operatively coupled to an operator terminal 320 and customer electronic mobile devices 321-322, via a communication network 350, which can be any network over which information can be transmitted between devices communicatively coupled to the network. For example, the communication network 350 can be the Internet, Intranet, virtual private network (VPN), wide area network (WAN), local area network (LAN), and the like. The environment 300 can include repositories or databases 330, 331, which can be operatively coupled to the servers 310-312, as well as to the operator terminal 320 and the customer electronic mobile devices 321-322, via the communications network 350. The servers 310-312, operator terminal 320, customer devices 321-322, and databases 330, 331 can each be implemented as a computing device. An exemplary embodiment of a computing device is shown in FIG. 4.

Those skilled in the art will recognize that the databases 330, 331 can be incorporated into one or more of the servers 310-311 such that one or more of the servers can include databases.

In an exemplary embodiment, the engine 100 can be implemented by the server 310. In some embodiments, the engine 100 can be distributed over different servers. For example, the modules 110 and 140 can be implemented on the server 311 and the modules 120 and 130 can be implemented on the server 312. In some embodiments, the engine 100, or portions thereof, can be implemented on the operator terminal 320.

In exemplary embodiments, the customer devices 321-322 can include a client-side application 323 programmed and/or configured to permit the devices 321-322 to participate in the customer location monitoring service 102 implemented via an embodiment of the engine 100. For example, in one embodiment, the client-side application 323 can be a software application programmed and/or including executable code to facilitate interaction with the engine 100. The client-side application 323 can be programmed to track a location of the customer (e.g., using GPS) relative the boundary defined by execution of the engine 100 (e.g., by the server 310) and can be programmed and/or configured to generate and send one or more messages to the engine 100 to indicate that the customer has entered the boundary and/or that the customer intends to pick-up his/her order. In the present embodiment, the devices 321-322 can be portable electronic devices configured for wireless communication, such as a tablet, a laptop computer, mobile phone, and/or any other suitable electronic device that permits its location to be identified and/or tracked (e.g., via WiFi, GPS, cellular triangulation, etc.).

The databases 330-331 can store information for use by the environment 300. For example, the databases 330-331 can store information related to geographic boundaries, subscribers to the customer location monitoring service 102, pending order, presence of customers located within or outside of a boundary as well as other any other information for implementing the customer location monitoring service 102 in accordance with the present disclosure.

In one exemplary operation, the server 310 can execute the engine 100 to implement the service 102 by a retail entity that facilitates order fulfillment and/or order staging in response to a presence of a customer's mobile device 321 within the boundary monitored by the engine 100. For example, a customer can submit an order for an item through the customer's mobile device, through any suitable device, and/or in person, and the customer can subscribe to the service 102 to associate the order with the customer's mobile device 321. In exemplary embodiments, the order information can be stored in the database 330 and the subscription information can be stored in the database 331. In some embodiments, the client-side application 323 can be downloaded to and/or installed on the customer's mobile device 321 and an account can be generated to subscribe the customer to the service 102.

In exemplary embodiments, upon subscribing to the service 102 and placing an order, the service 102 can be programmed to execute the engine 100 to maintain the order information and to send an encoded identifier associated with the order to the customer (e.g., to the customer's mobile device 321). The employees at the retail entity's physical location can process orders as they come in (e.g., based on a queue) and/or can process orders according to another suitable procedure and can prioritize orders based on notifications received from the service 102.

The customer, carrying the customer's mobile device 321 executing the client-side application 323, can travel to the retail entity's physical location. When the customer's mobile device 321 enters the geographic boundary monitored by the server 310 executing the engine 100, the customer's presence within the boundary can be determined based on the presence of the customer's mobile device 321. As one example, the customer's mobile device can execute the client-side application 323 to track the customer's location relative to the geographic boundary (e.g., using GPS) and when the customer's mobile device 321 enters the geographical boundary the mobile device 321 can execute the client-side application 323 to send a message from the customer's mobile device 321 to the server 310 notifying the engine 100 that the customer is within the geographic boundary. In some embodiments, the client-side application 323 can be programmed to allow the customer to indicate that the customer intends to pick-up the order and the mobile device 321 can execute the client-side application 323 to send a message to the server 310 to indicate the customer's intentions.

In response to the detection of the customer's mobile device within the boundary, the server 310 can execute the engine 100 to retrieve the order information from the database 330 based on an identifier associated with the customer, can generate a notification indicating that the customer is in the vicinity of the physical location of the retail entity, and can execute the engine 100 to send the notification to the operator terminal 320 located at the physical location of the retail entity. In some embodiments, the notification can alert the employees of the retail entity that the customer's order should be prioritized and/or alert the employees to stage the order for pick-up. In some embodiments, the server 310 can execute the engine 100 to generate a notification when one or more messages are received from the customer's mobile device 321 indicating that the mobile device 321 is within the geographic boundary and/or that the customer intends to pick-up the order.

When the customer arrives at the physical location of the retail entity, the customer can display the encoded identifier on the mobile device 321 and can present the encoded identifier to an employee of the retail entity. The employee can scan the encoded identifier (e.g., via the operator terminal 320). The operator terminal 320 can send the scanned encoded identifier to the server 310 and the engine 100 can programmed to retrieve the order information from the database 330 based on scanned encoded identifier.

In some embodiments, the server 310 can execute the engine 100 to send the operator terminal 320 the order information retrieved from the database 330 and to instruct the operator terminal 320 to communicate with one or more indicator(s) 360 associated with the item(s) 370 of the order. In some embodiments, the server 310 can execute the engine 100 to control or activate the indicators 360 corresponding to the items 370 of the order. The indicators 360 can include, for example, a light source associated with (e.g., affixed to) the item that can be illuminated and/or can include, for example, an audible device (e.g., a speaker, buzzer, etc.) that can output audible sound so that the employee can quickly and easily identify and retrieve the items 370 included in the order. In some embodiments, the indicators 360 can be implemented as radio frequency identification devices (RFIDs).

FIG. 4 is a block diagram of an exemplary computing device 400 that may be used to implement an exemplary electronic commerce system that includes an embodiment of the engine 100. The computing device 400 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives), and the like. For example, memory 406 included in the computing device 400 may store computer-readable and computer-executable instructions or software for implementing exemplary embodiments of the engine 100. The computing device 400 also includes configurable and/or programmable processor 402 and associated core 404, and optionally, one or more additional configurable and/or programmable processor(s) 402' and associated core(s) 404' (for example, in the case of computer systems having multiple processors/cores), for executing computer-readable and computer-executable instructions or software stored in the memory 406 and other programs for controlling system hardware. Processor 402 and processor(s) 402' may each be a single core processor or multiple core (404 and 404') processor.

Virtualization may be employed in the computing device 400 so that infrastructure and resources in the computing device may be shared dynamically. A virtual machine 414 may be provided to handle a process running on multiple processors so that the process appears to be using only one computing resource rather than multiple computing resources. Multiple virtual machines may also be used with one processor.

Memory 406 may include a computer system memory or random access memory, such as DRAM, SRAM, EDO RAM, and the like. Memory 406 may include other types of memory as well, or combinations thereof.

A customer may interact with the computing device 400 through a visual display device 418, such as a computer monitor, which may display one or more user interfaces 420 that may be provided in accordance with exemplary embodiments. The computing device 400 may include other I/O devices for receiving input from a customer, for example, a keyboard or any suitable multi-point touch interface 408, a pointing device 410 (e.g., a mouse). The keyboard 408 and the pointing device 410 may be coupled to the visual display device 418. The computing device 400 may include other suitable conventional I/O peripherals.

The computing device 400 may also include one or more storage devices 424, such as a hard-drive, CD-ROM, or other computer readable media, for storing data and computer-readable instructions and/or software that implement exemplary embodiments of the engine 100 described herein. Exemplary storage device 424 may also store one or more databases for storing any suitable information required to implement exemplary embodiments. For example, exemplary storage device 424 can store one or more databases 426 for storing information, such as geographic boundaries, subscribers to the customer location monitoring service, pending order, presence of customers located within or outside of a boundary as well as other any other information for implementing the customer location monitoring service in accordance with the present disclosure. The databases may be updated manually or automatically at any suitable time to add, delete, and/or update one or more items in the databases.

The computing device 400 can include a network interface 412 configured to interface via one or more network devices 422 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections (including via cellular base stations), controller area network (CAN), or some combination of any or all of the above. In exemplary embodiments, the computing device 400 can include one or more antennas 413 to facilitate wireless communication (e.g., via the network interface) between the computing device 400 and a network. The network interface 412 may include a built-in network adapter, network interface card, PCMCIA network card, card bus network adapter, wireless network adapter, USB network adapter, modem or any other device suitable for interfacing the computing device 400 to any type of network capable of communication and performing the operations described herein. Moreover, the computing device 400 may be any computer system, such as a workstation, desktop computer, server, laptop, handheld computer, tablet computer (e.g., the iPad™ tablet computer), mobile computing or communication device (e.g., the iPhone™ communication device), or other form of computing or telecommunications device that is capable of communication and that has sufficient processor power and memory capacity to perform the operations described herein.

The computing device 400 may run any operating system 416, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, or any other operating system capable of running on the computing device and performing the operations described herein. In exemplary embodiments, the operating system 416 may be run in native mode or emulated mode. In an exemplary embodiment, the operating system 416 may be run on one or more cloud machine instances.

Figure 5:
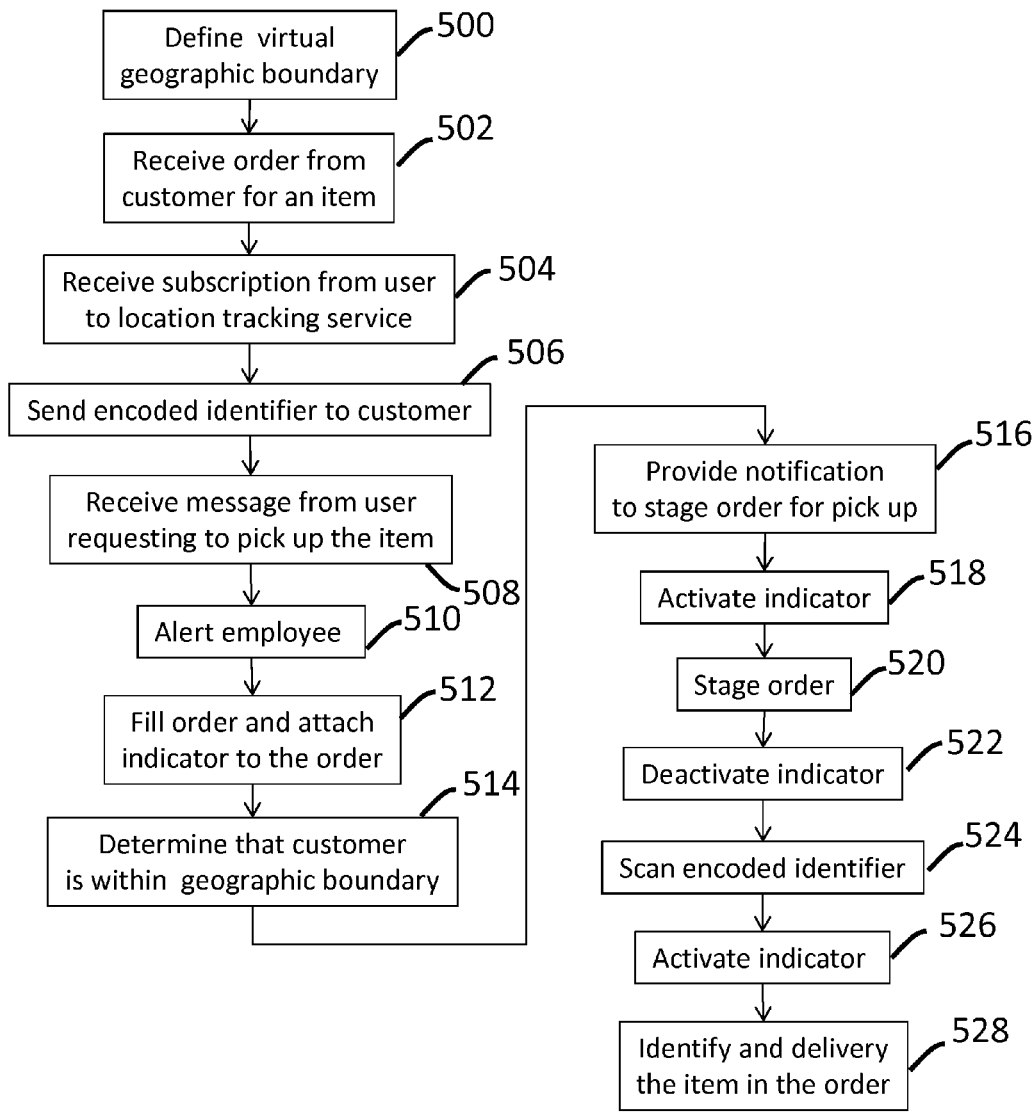
FIG. 5 is a flowchart illustrating an exemplary operation of an embodiment of customer location monitoring service implemented by an embodiment of the engine.

FIG. 5 is a flowchart illustrating an exemplary operation of an embodiment of the customer location monitoring service implemented by an embodiment of the engine 100 in an electronic commerce environment. In step 500, a geographical boundary is defined to encompass a geographical area. In step 502, an order for an item is received from a customer by a retail entity. In step 504, an electronic subscription to the customer location monitoring service can be received by the engine 100 and in step 506, the engine 100 is programmed to send an encoded identifier to the customer. At step 508, the engine 100 can receive an electronic message from the customer indicating that the customer intends to pick-up his order. In response, the engine 100 can programmatically alert an employee of the retail entity that the customer will be picking up his order at step 510. The engine 100 can programmatically alert an employee by sending an electronic notification to the employee. The electronic notification can instruct the employee to fill the customer's order and associate an indicator with the item(s) of the order. At step 512, the employee can fill the order and attach an indicator to at least one item in the order. In step 514, the engine 100 can programmatically determine that the customer is within the defined boundary (e.g., based on an electronic message received by the engine 100). In response, the engine 100 can programmatically alert an employee of the retail entity indicating that the customer has entered the geographic boundary at step 516. The engine 100 can programmatically alert an employee by sending an electronic notification to the employee (e.g., the operating terminal used by the employee). The electronic notification can instruct the employee to stage the customer's order for pick-up. In step 518, the engine 100 can programmatically activate the indicator to aid in identifying and staging the order for pick-up and in step 520 the employee can stage the order. The indicator can be deactivated once the order has been staged at step 522.

When the customer arrives at the physical location of the retail entity, the customer can present the encoded identifier, and in step 524, the encoded identifier (e.g., a bar code, Quick Response (QR) code, etc.) can be scanned and the engine 100 can programmatically activate the indicator in response to the scanning in step 526 so that the employee can identify and deliver the item(s) of the order to the customer in step 528.

While FIG. 5 illustrates an exemplary operation of an embodiment of the customer location monitoring service implemented by an embodiment of the engine 100, those skilled in the art will recognize that various other embodiments can be implemented. As one example, in exemplary embodiments step 504 in FIG. 5 can be performed before step 502. As another example, FIG. 6 shows a further exemplary embodiment illustrating an operation of an embodiment of the customer location monitoring service.

Figure 6:
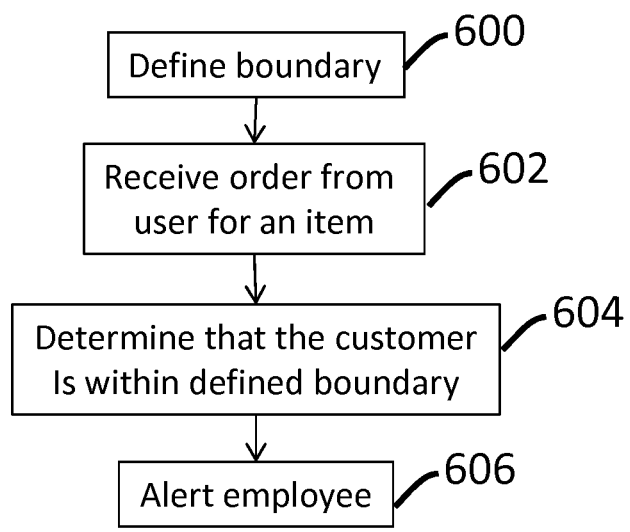
FIG. 6 is a flowchart illustrating another exemplary operation of an embodiment of customer location monitoring service implemented by an embodiment of the engine.

FIG. 6 is a flowchart illustrating an exemplary operation of an embodiment of customer location monitoring service implemented by an embodiment of the engine 100 in an electronic commerce environment. In step 600, a geographical boundary is defined to encompass a geographical area (e.g., using one or more wireless access points and/or a geo-fence). In step 602, an electronic order for an item is received from a customer by a retail entity. In step 604, the engine 100 can programmatically determine that the customer is within the defined boundary (e.g., by receiving customer location data from the customer's mobile device via the one or more wireless access points and/or using GPS tracking on the customer's mobile device). In response, the engine 100 can programmatically generate electronic notifications to alert an employee of the retail entity that the customer has entered the geographic boundary at step 606. The electronic notifications can instruct the employee to fill the customer's order and/or stage the customer's order for pick-up.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a plurality of system elements, device components or method steps, those elements, components or steps may be replaced with a single element, component or step. Likewise, a single element, component or step may be replaced with a plurality of elements, components or steps that serve the same purpose. Moreover, while exemplary embodiments have been shown and described with references to particular embodiments thereof, those of ordinary skill in the art will understand that various substitutions and alterations in form and detail may be made therein without departing from the scope of the invention. Further still, other embodiments, functions and advantages are also within the scope of the invention.

Exemplary flowcharts are provided herein for illustrative purposes and are non-limiting examples of methods. One of ordinary skill in the art will recognize that exemplary methods may include more or fewer steps than those illustrated in the exemplary flowcharts, and that the steps in the exemplary flowcharts may be performed in a different order than the order shown in the illustrative flowcharts.

In addition to application to pharmacies, the disclosed embodiments are well suited for use in various order pick-up applications, such as, but not limited to dry cleaners, Laundromats, delis and deli departments, merchandise pick-up, and other like businesses and services.

The invention claimed is:

1. In an electronic commerce environment, a method of processing an order for an item, the method comprising:
   executing code in an electronic commerce environment including one or more computing devices to create a geo-fence defining a geographic boundary associated with a physical location of a retail entity, the geographic boundary defined by the geo-fence being specified according to coordinates on a geographic map to encompass the physical location;
   receiving, from a customer via the electronic commerce environment, an order for an item from the retail location;
   receiving, by the one or more computing devices in the electronic commerce environment, an electronic message from a mobile device associated with the customer indicating that the customer intends to pick-up the order;
   generating a notification by the one or more computing devices to fill the order in response to the electronic message received from the mobile device;
   determining the customer is within the geographic boundary based on GPS-based tracking of the mobile device associated with the customer;
   generating a notification to stage the order for the item by the one or more computing devices in the electronic commerce environment in response to determining the customer is within the geographical boundary;
   controlling, via the one or more computing devices, an indicator affixed to the item to activate the indicator in response to generation of the notification to stage the order;
   controlling, via the one or more computing devices, the indicator affixed to the item to deactivate the indicator subsequent to the staging of the order;
   scanning an identifier when the customer arrives at the physical location of the retail entity to identify the item associated with the order; and
   controlling, via the one or more computing devices, the indicator associated with the order to activate the indicator in response to scanning the identifier.

2. The method of claim 1, wherein generating the notification to fill the order comprises generating an electronic notification to prioritize fulfillment of the order.

3. The method of claim 1, wherein the order is an electronic order received via a data communications network.

4. The method of claim 1, further comprising receiving an electronic subscription to a location monitoring service from the customer, the subscription permitting determining whether the customer is within the geographic boundary.

5. The method of claim 1, wherein the indicator is a light source affixed to the item and controlling the indicator to activate the indicator comprises illuminating the light source.

6. The method of claim 1, further comprising:
   sending the identifier associated with the order to the customer for presentation via the mobile device,
   wherein scanning the identifier comprises scanning the identifier presented via the mobile device when the customer arrives at the physical location of the retail entity to identify the item associated with the order.

7. A non-transitory computer-readable medium configured to store instructions executable by one or more processing devices, wherein execution of the instructions in an electronic commerce environment causes the one or more processing devices to implement a method of processing an order for an item comprising:
   reading instructions to create a geo-fence defining a geographic boundary associated with a physical location of a retail entity, the geographic boundary defined by the geo-fence being specified according to coordinates on a geographic map to encompass the physical location;

receiving, from a customer via an electronic commerce environment, an order for an item from the retail location;

receiving, by the one or more processing devices, an electronic message from a mobile device of the customer subsequent to receipt of the order, the electronic message indicating that the customer intends to pick-up the order;

reading instructions to generate a notification by the one or more processing devices to fill the order in response to the electronic message received from the mobile device;

reading instructions to determine whether the customer is within the geographic boundary based on GPS-based tracking of the mobile device associated with the customer; and reading instructions to generate a notification by the one or more processing devices to stage the item for pick-up based on determining whether the customer is within the geographical boundary;

reading instructions to control, via the one or more processing devices, an indicator affixed to the item to activate the indicator in response to generation of the notification to stage the order;

reading instructions to control, via the one or more computing devices, the indicator affixed to the item to deactivate the indicator subsequent to the staging of the order;

reading instructions to scan an identifier when the customer arrives at the physical location of the retail entity to identify the item associated with the order; and reading instructions to control, via the one or more processing devices, the indicator associated with the order to activate the indicator in response to scanning the identifier.

8. The medium of claim 7, wherein generating the electronic notification to fill the order comprises generating a notification to prioritize fulfillment of the order.

9. The medium of claim 7, wherein the method implemented in response to execution of the instructions further comprises receiving a subscription to a location monitoring service from the customer, the subscription permitting determining whether the customer is within the geographic boundary.

10. The medium of claim 7, wherein the method implemented in response to execution of the instructions further comprises controlling the indicator associated with the item to activate the indicator comprises illuminating a light source.

11. The medium of claim 7 wherein the method implemented in response to execution of the instructions further comprises sending the identifier associated with the order to the customer for presentation via the mobile device, and wherein scanning the identifier comprises scanning the identifier presented via the mobile device when the customer arrives at the physical location of the retail entity to identify the item associated with the order.

12. An electronic commerce system for processing an order for an item comprising:

a non-transitory computer readable medium storing an order processing engine; and one or more processing devices programmed to execute the order processing engine to:

create a geo-fence to define a geographic boundary associated with a physical location of a retail entity, the geographic boundary defined by the geo-fence being specified according to coordinates on a geographic map to encompass the physical location;

receive, from a customer, an electronic order for an item from the retail location; receive an electronic message from a mobile device associated with the customer subsequent to receipt of the order, the electronic message indicating that the customer intends to pick-up the order;

generate a notification to fill the order in response to the electronic message received from the mobile device;

determine whether the customer is within the geographic boundary based on GPS-based tracking of the mobile device associated with the customer; and generate a notification to stage the order for pick-up based on determining whether the customer is within the geographical boundary;

control an indicator affixed to the item to activate the indicator in response to generation of the notification to stage the order;

control the indicator affixed to the item to deactivate the indicator subsequent to the staging of the order;

scan an identifier when the customer arrives at the physical location of the retail entity to identify the item associated with the order; and control the indicator associated with the order to activate the indicator in response to scanning the identifier.

13. The system of claim 12, wherein the processing device is programmed to execute the order processing engine to receive an electronic subscription to a location monitoring service from the customer, the electronic subscription permitting determining whether the customer is within the geographic boundary.

14. The system of claim 12, wherein the indicators comprises a light source and the processing device is programmed to control the light source to activate the light source by illuminating the light source.

15. The system of claim 12, wherein the processing device is programmed to send the identifier associated with the order to the customer for presentation via the mobile device, and scanning the identifier comprises scanning the identifier presented via the mobile device when the customer arrives at the physical location of the retail entity to identify the item associated with the order.

* * * * *